United States Patent
Chen et al.

(10) Patent No.: US 9,747,207 B2
(45) Date of Patent: Aug. 29, 2017

(54) CRASH-PROOF CACHE DATA PROTECTION METHOD AND SYSTEM

(71) Applicant: Beijing Fortunet Information & Technology Co., Ltd, Beijing (CN)

(72) Inventors: Jie Chen, Beijing (CN); Weiliang Shen, Beijing (CN)

(73) Assignee: Beijing Fortunet Information & Technology Co., Ltd, Beijing (CN)

( * ) Notice: Subject to any disclaimer, the term of this patent is extended or adjusted under 35 U.S.C. 154(b) by 42 days.

(21) Appl. No.: 15/016,540

(22) Filed: Feb. 5, 2016

(65) Prior Publication Data

US 2016/0232090 A1 Aug. 11, 2016

(30) Foreign Application Priority Data

Feb. 6, 2015 (CN) .......................... 2015 1 0063990
Feb. 13, 2015 (CN) .......................... 2015 1 0077236

(51) Int. Cl.
G06F 12/00 (2006.01)
G06F 12/0802 (2016.01)
G06F 11/14 (2006.01)

(52) U.S. Cl.
CPC ...... *G06F 12/0802* (2013.01); *G06F 11/1441* (2013.01); *G06F 2212/60* (2013.01)

(58) Field of Classification Search
None
See application file for complete search history.

(56) References Cited

U.S. PATENT DOCUMENTS

| 2013/0013865 A1* | 1/2013 | Venkatesh | G06F 17/30132 711/133 |
| 2016/0259726 A1* | 9/2016 | Ide | G06F 3/06 |
| 2016/0283336 A1* | 9/2016 | Petersen | G06F 11/2015 |

* cited by examiner

*Primary Examiner* — Daniel Tsui
(74) *Attorney, Agent, or Firm* — Timothy T. Wang; Ni, Wang & Massand, PLLC

(57) ABSTRACT

The inventions disclosed herein provide a crash-proof cache data protection method and system. The cache data backup steps include: when power interruption unexpectedly occur, a preselected central processing unit receiving an interrupt request signal; querying to obtain index nodes of block devices corresponding to logical volume management volumes; according to the index nodes, acquiring a page needing to be stored in a flash memory; acquiring a buffer head in the page, and storing information of the buffer head and buffer data corresponding to the buffer head into the flash memory, and generating backup data. The cache data recovery steps include: acquiring the backup data which includes an unique ID of the block device and a logic block ID; calculating the block address of the backup data needing to be recovered using the logic block ID, querying a logic volume path of the block addresses in a volume database according to a unique identifier, and writing the backup data into the block addresses in a mode of a virtual file system so as to recover cache data.

10 Claims, 3 Drawing Sheets

CRASH-PROOF CACHE DATA PROTECTION METHOD AND SYSTEM

CROSS REFERENCE TO RELATED APPLICATIONS

This application claims priority to Chinese Patent Application No. 201510063990.8, entitled "CRASH-PROOF CACHE DATA PROTECTION METHOD AND SYSTEM", filed on Feb. 6, 2015, and Chinese Patent Application No. 201510077236.X, entitled "CRASH-PROOF CACHE DATA PROTECTION METHOD AND SYSTEM", filed on Feb. 13, 2015, the entire contents of which are incorporated herein by reference.

FIELD OF THE INVENTION

The present invention relates to the field of computer equipment, and more particularly to a crash-proof cache data protection method and system.

BACKGROUND OF THE INVENTION

Disk data cache is a software mechanism. It refers to the process where computer storage devices save data usually residing in a hard disk into a RAM (Random Access Memory). When a computer processes data, it directly processes the data in RAM rather than fetching the data from a hard disk memory, thus improves processing efficiency. However, RAM is a volatile memory. When power is unexpectedly off, the data stored in RAM often gets lost and cannot be saved.

SUMMARY OF THE INVENTION

In response to these issues, the present invention provides a method and system for preventing data loss due to sudden interruption of power supply.

In the present invention a crash-proof cache data protection method and system includes cache data backup steps and cache data recovery steps.

The cache data backup steps include:

Receiving an interrupt request signal by a preselected CPU when an unexpected power interruption occurs;

Querying to obtain one or more index nodes of block devices corresponding to logical volume management volumes;

Acquiring the page needing to be stored in a flash memory according to the index nodes;

Acquiring a buffer head in the page and storing the buffer head information and corresponding buffer data to a flash memory as backup data.

The cache data recovery steps include:

Acquiring the backup data which includes an unique identifier of the block device and a logic block ID;

Calculating the block address of the backup data needing to be recovered according to the logic block ID;

Writing the backup data into the block addresses in a mode of a virtual file system to recover buffer data using a logic volume path inquired from the volume database based on the unique identifier.

In a preferred embodiment, before restoring all backup data, several determining steps are included:

A determination module or unit acquires a backup identification parameter from the backup data in the flash memory when power is back up and identify the value of the backup identification parameter.

When the backup identification parameter equals to 1, the system executes the steps of recovering backup data.

When the backup identification parameter equals to 0, the system does not execute the steps of recovering backup data.

In another preferred embodiment, after querying a logic volume path of the block addresses in a volume database according to a unique identifier and writing the backup data into the block addresses in a mode of a virtual file system so as to recover cache data, the system executes the following step:

Setting the backup identification parameter to 0.

In another preferred embodiment, the step of querying to obtain index nodes of block devices corresponding to logical volume management volumes further includes the steps of:

Exporting doubly linked lists for all block devices and said doubly linked list includes pointers for all said block devices.

Querying to obtain index nodes of block devices corresponding to logical volume management volumes by comparing said logical volume management volumes and doubly linked list pointers to locate the block devices with doubly linked list pointers that match the pointers in said logical volume management volumes.

In another preferred embodiment, the step of acquiring a page needing to be stored in a flash memory according to said index nodes further include the following steps:

Acquiring a page by using a pointer in an index node obtained by searching the labeled index nodes in a radix tree.

The inventions disclosed herein also provide a crash-proof cache data protection system that includes a cache data backup module and a cache data recovery module.

The cache backup module includes a receiver unit, an access and inquiry unit, a page unit, and an access and generation unit.

The receiver unit includes a preselected CPU that receives an interrupt request signal when an unexpected power outage occurs.

The access and inquiry unit may query and obtain index nodes of one or more block devices corresponding to logical volume management volumes.

The page unit acquire a page needing to be stored in a flash memory according to said index nodes.

The access and generation unit acquires a buffer head in the page and stores information of said buffer head and buffer data corresponding to the buffer head into a flash memory, and generates backup data.

The cache data recovery module further includes an acquisition unit, a conversion unit and a query and recovery unit.

The acquisition unit acquires the backup data which includes a unique ID of the block device and a logic block ID.

The conversion unit calculates the block address of the backup data needing to be recovered using the logic block ID.

The query and recovery unit queries a logic volume path of block addresses in a volume database according to said unique ID and writes the backup data into the block address in a mode of a virtual file system to recover cache data.

In a preferred embodiment, the disclosed system further includes a determination unit. The determination unit obtains the identification parameter form the backup data in the flash memory when the power is back up and identifying the backup identification parameter. When the backup identification parameter is 1, the acquisition unit acquires the backup data. When the backup identification parameter is 0, the acquisition unit does not obtain the said backup data.

In a preferred embodiment, the cache data recovery module further comprises a configuration unit. The said configuration unit sets the backup identification parameter to 0 after the buffer data has been restored.

In a preferred embodiment, the access and inquiry unit may further includes an export sub-unit and comparison sub-unit.

The export sub-unit exports doubly linked lists for all block devices and the doubly linked list include pointers for all said block devices.

The comparison sub-unit queries and obtains index nodes of block devices corresponding to logical volume management volumes by comparing said logical volume management volumes and doubly linked list pointers to locate the block devices with doubly linked list pointers that match the pointers in said logical volume management volumes.

In a preferred embodiment, the page unit further includes a search sub-unit that acquire the page by using a pointer in an index node obtained by searching the labeled index nodes in a radix tree.

The advantages of the disclosed invention include:

When an unexpected power outage occurs, the system will be able to utilize the remaining power to write the cache data stored in volatile memory into non-volatile flash memory. When the power is restored, the system then write the backup cache data in the flash memory back to block devices, so as to effectively preventing data loss due to sudden interruption of power supply.

DETAILED DESCRIPTION

Figure 1:
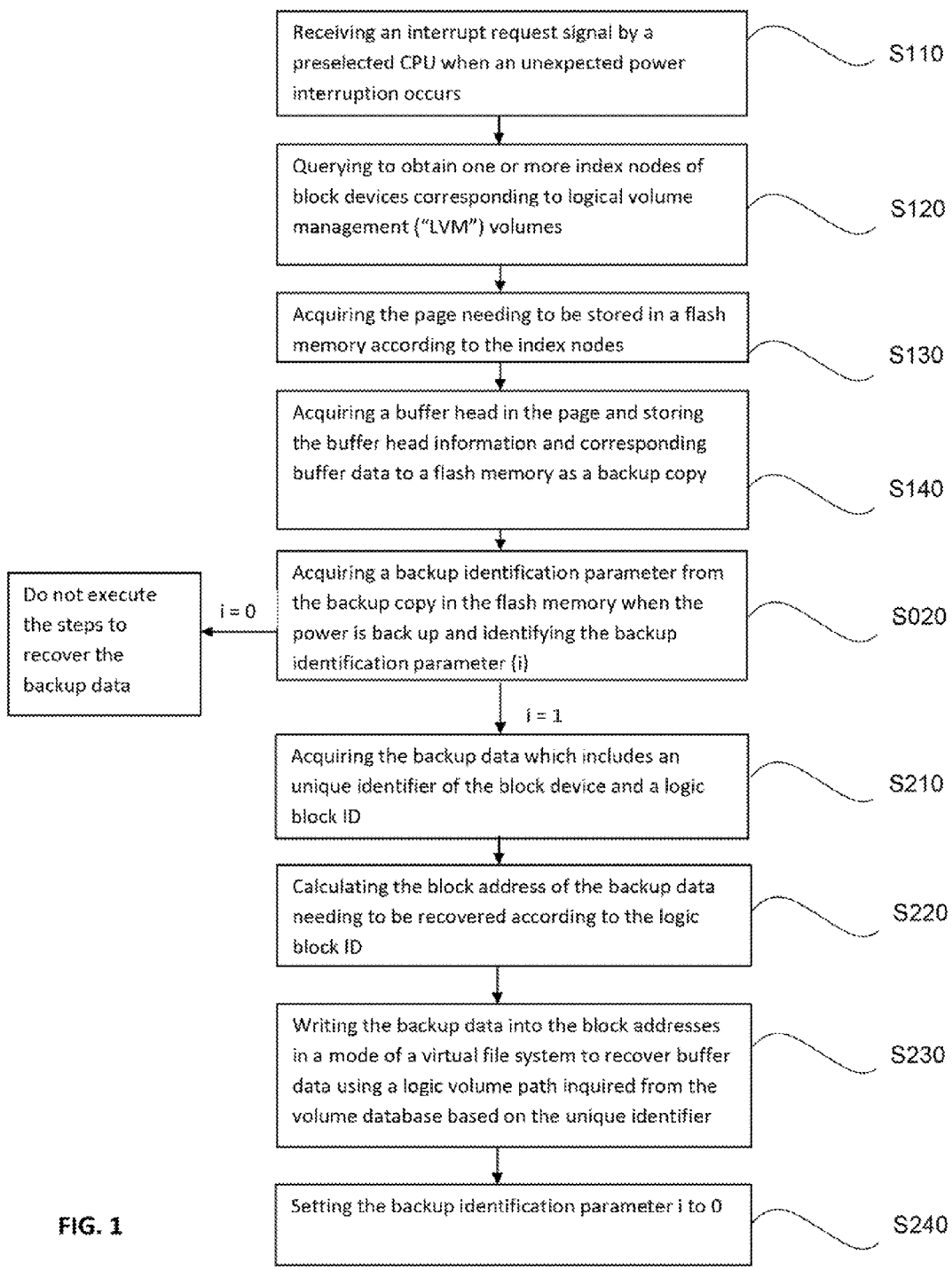
FIG. 1 is a flow chart of one preferred embodiment of the disclosed crash-proof cache data protection method and system.

The following are detailed description of the present system and method with reference of the drawings:

As shown in FIG. 1, in this invention a crash-proof cache data protection method includes cache data backup steps and cache data recovery steps. The cache data backup steps include:

S110, receiving an interrupt request signal by a preselected CPU when an unexpected power outage occurs.

S120, querying to obtain one or more index nodes of block devices corresponding to logical volume management ("LVM") volumes.

S130, acquiring the page needing to be stored in a flash memory according to the index nodes.

S140, acquiring a buffer head in the page and storing the buffer head information and corresponding buffer data to a flash memory as backup data.

The cache data recovery steps include:

S210, acquiring the backup data which includes a unique identifier of the block device and a logic block ID.

S220, calculating the block address of the backup data needing to be recovered according to the logic block ID.

S230, writing the backup data into the block addresses in a mode of a virtual file system to recover buffer data using a logic volume path inquired from the volume database based on the unique identifier.

The invention disclosed herein is based on the Linux environment. Linux is a multi-user, multi-tasking, multi-threading and multi-CPU (Central Processing Unit) operating system. When an unexpected power outage occurs, a preselected CPU receives an IRQ (Interrupt Request) signal, then the preselected CPU forces other CPUs to shut down. Meanwhile, the CPU stops responding to other IRQ signals to avoid errors that may be caused by processing memory data at the same time. The disk partition of the block devices of the system (such as hard disk, tape, etc.) is managed using the LVM (Logic Volume Manager) mechanism. Users can freely adjust the size of the file system without the need for system downtime. Users can also easily implement a file system across different disks and partitions. Logical volume is the storage structure for the user and applications. The physical volume is for the operating system and the storage structure of the machine. When an unexpected power outage occurs, the system can use any remaining power to backup cache data. The operating system goes through the corresponding logical block index nodes to get paged memory backup, and the backup data is generated based on the data page. When power is restored, the operating system rewrites backup data to memory, preventing data loss from the sudden interruption and loss of power.

It should be noted that LVM organizes disk array into volumes, accessing these volumes by a virtual file system ("VFS") to meet the need for high speed disk cache. Although the virtual file system reads and writes volumes as files, the actual operation of the volumes is conducted via the operation of block devices. For example, all the information needed to deal with a virtual file system file are stored in an inode (index node) structure. File name can be assigned and changed, but inode is unique for each file. Each file has only one inode, and as long as the file exists, the corresponding inode will remain unchanged. Meanwhile, the disk cache to access the file also exist in the inode.

Inode may include a structure as follows:

```
Struct inode {
    ...
    Const struct inode_operations       *i_op;
    Struct super_block                  *i_sb;
    Struct address_space                *i_mapping;
    unsigned long                       i_ino;
    dev_t                               i_rdev;
    spinlock_t                          i_lock;
    struct list_head                    i_sb_list;
    struct address_space                  i_data;
    struct list_head                        i_device;
    struct block_device                 *i_bdev;
    ...
}
``` i_op: inode calculation;
i_sb: super block object pointer;
i_mapping: pointer that points to the address_space object;
i_ino: inode number;
i_rdev: real device identifier;
i_lock: spinlocks, to protect certain inode section;
i_sb_list: serial index (comprised of the superblock's inode);
i_data: address_space of the object files;
i_device: serial indexes (comprised of the inodes of specific character equipment or an associated group of equipment);
i_bdev: index pointing to a set of device drivers.

address_space (address space) structure is an important data structure of the page, the data structure is embedded in the inode object that owns the page.

address_space includes the following structure:

```
struct address_space{
    ...
    struct inode                        *host;
    struct radix_ tree_root             page_tree;
    spinlock_t                          tree_lock;
    unsigned long                       nrpages;
    coast structaddress_space_operations *a_ops;
    ...
}
``` host: pointer pointing to the inode of a storage object;
page_tree: radix root tree: this tree is used to identify the pages owned by a user;
tree_lock: spinlock protecting the radix tree;
nrpages: the total number of pages owned by a user;
a_ops: the available operations of the pages owned by a user.

A page has an additional descriptor called buffer head, whose main purpose is to quickly find each disk block address in a page. a buffer head's main structure is as follows:

```
struct buffer_head{
    ...
    struct buffer_head      *b_this_page;
    struct page             *b_page;
    sector_t                 b_blocknr;
    char                    *b_data;
    struct block_device     *b_bdev;
    ...}
``` b_this_page: the serial pointer of this page;
b_page: pointer of the descriptor of the buffer head of this page;
b_blocknr: logical block number;
b_data: a block device's position within the page;
b_bdev: pointer pointing to the descriptor of a group of devices.

The modules of the system maintain a volume database. When the cache data backup and caching data recovery steps are triggered, the volume database is used for the system backup and restoration of the data in each volume. When the power supply has an unexpected interruption, the interrupt request signal triggers cache data backup procedure. The cache data is stored in flash memory using the residual power of the system. When the power is restored, it triggers cache data recovery steps: data stored in flash memory will be restore to a volume corresponding to the volume database. When a volume is added or deleted from the top level of a LVM, the volume database must be synchronized using system call Syscall (when the system is turned on again, the volumes already built up by the LVM must be synchronized first with the LVM).

The main structure of the Logical Volume Manager volume is as follows:

```
list_head               all_lvm_volumes;
struct lvm_volume{
    char *              lv_name;
    char*               lv_path;
    char                uuid[DM_UUID_LEN];
    dev_t               bd_dev;
    struct list_head    lv_list;
}
API:
```

```
__add_lvm_volume(struct *volume);
__del_lvm_volume(char * uuid).
the main structure of the backup data is shown below:
structure cache_backup_data{
    char                            uuid[DM_UUID_LEN];
    sector_t                        b_blocknr;
    size_t                          b_size;
    char                            b_data[b_size];
}
uuid: uuid of a block device
b_blocknr: this logic block ID of a block in block device
b_size: block size
b_data: The actual block data
```

In a preferred embodiment, another step S020 occurs before the step of restoring the backup data: obtaining the backup identification parameter from the backup copy in the flash memory when the power is back up and identifying the value of the backup identification parameter. The system will not execute the steps to recover the backup data when the backup identification parameter is 0, and the system will execute the steps to recover the backup data when the backup identification parameter is 1.

A cache_backup_control structure is located at the beginning of flash memory. This design makes it easier to process backup data when the system starts recovering backup data. When the backup identification parameter is 1, it means that the system is abnormal and a recovery of backup data is needed. The cache_backup_control structure contains backup_data_nr, which is used to identify how many block data are needed to write. This identification procedure helps protect the system from resources overflow when the system write backup data stored in flask memory to cache data.

The main structure of cache_backup_control is as follows:

```
struct cache_backup_control {
    unsigned char                   backup_flag;
    unsigned int                    backup_data_nr;
}
backup_flag: 1 means cache backup happened before power on. 0 means no.
backup_data_nr: the amount of data in cache backup.
```

In another preferred embodiment, the method includes another step S240 after step S230. The S240 step is setting the backup identification parameter to 0, which means the backup data recovery is completed.

Figure 2:
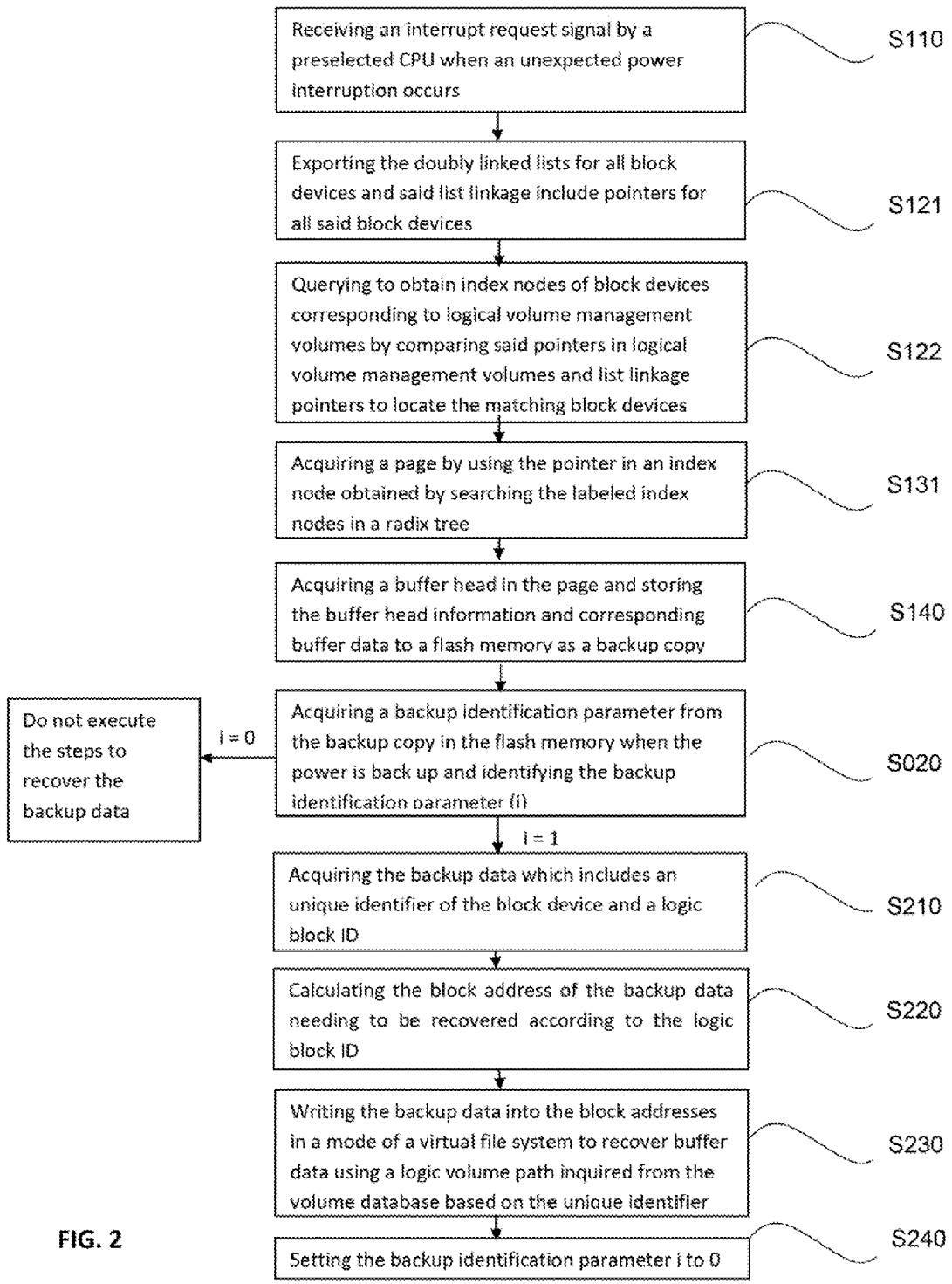
FIG. 2 is a flow chart of another preferred embodiment of the disclosed crash-proof cache data protection method and system.

As shown in FIG. 2, step S120 includes the following steps:

S121, exporting the doubly linked lists for all block devices and said doubly linked list include pointers for all block devices.

S122, querying to obtain index nodes of block devices corresponding to logical volume management volumes by comparing said pointers in logical volume management volumes and doubly linked list pointers to locate the matching block devices. The inode of the block device is the inode of the matching block device in the logical volume management volumes.

The Linux kernel maintains a variable called all_bdevs, which is the head of a global list of list linkages. This doubly linked list includes the descriptors for all block devices, such as field indicators of the block devices. However, the doubly linked list must be exported before they can be used by kernel modules. To use the doubly linked list, the system must first run EXPORT_SYMBOL (all_bdevs). The system compares index fields from the acquired logical volume management volumes with the index fields of all block devices one by one. If the index field of a block device is the same with the index field of a logical volume management volume, the inode of block devices is inode of the corresponding block device in the logical volume management volume.

In another preferred embodiment, the step S130 further includes step S131 that acquire a page by using a pointer in an index node obtained by searching the labeled index nodes in a radix tree.

The virtual file system pages is stored in address_space of an inode structure. The page_tree field points to a radix tree root. Each node of each radix tree can have 64 pointers pointing to other nodes or pages. The lower level radix tree nodes stores indexes of the pages, and nodes in other levels of the radix tree stores indexes of other nodes. The use radix trees in Linux increase the speed of page searching. In order to quickly search a modified page, each node of the radix trees includes a label. The status of a label may be dirty or writeback. At either state, the label needs to be backed up. If a page in the tree is modified, the label for this page and the labels at all radix tree nodes above this page must be marked.

This disclosed invention also provides a crash-proof cache data protection system. It shares the same problem solving principle with the above discussed method. The applications of a crash-proof cache data protection system can refer to the detailed discussion of the method. Duplicate information will not be repeated.

Figure 3:
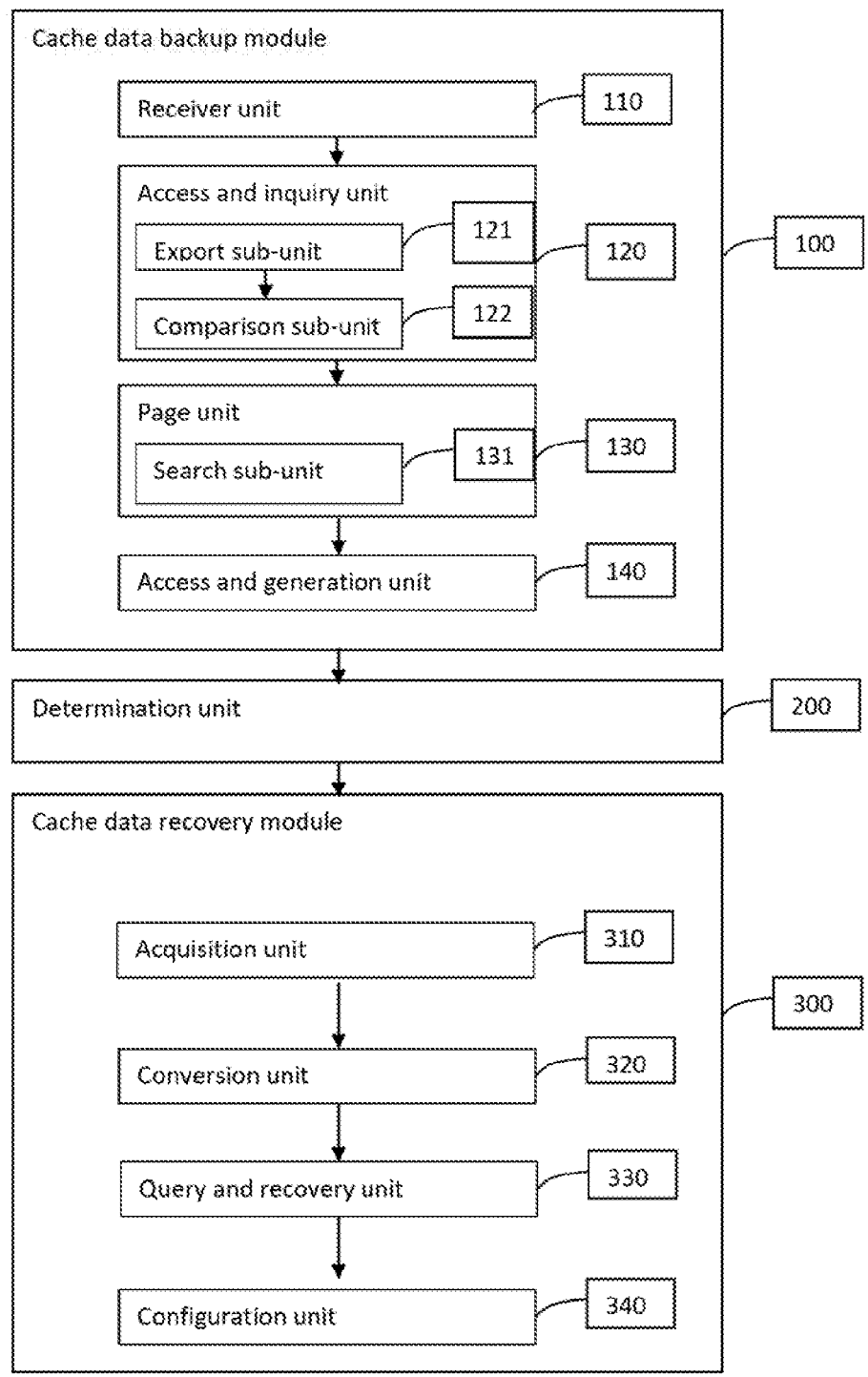
FIG. 3 is a structure diagram of one preferred embodiment of the disclosed crash-proof cache data protection system.

The crash-proof cache data protection system, shown in FIG. 3, includes a cache data backup module 100 and a cache data recovery module 300. The cache data backup module 100 further includes a receiver unit 110, an access and inquiry unit 120, a page unit 130 and an access and generation unit 140. The receiver unit 110 has a preselected CPU receiving an interrupt request signal when an unexpected power outage occurs. The access and inquiry unit 120 may obtain a LVM in a volume database and inquire the corresponding index node of a block device from the LVM.

The page unit 130 can obtain the page according to the inquired index node. The access and generation unit 140 can obtain buffer head information of the page and save the buffer head information and correspond buffer data to a flash memory as a backup copy.

The cache data recovery module 300 includes an acquisition unit 310, a conversion unit 320 and query and recovery unit 330. The acquisition unit 310 may acquire the backup data which includes a unique ID of the block device and a logic block ID. The conversion unit 320 may calculate the block address of the backup data needing to be recovered using the logic block ID. The query and recovery unit 330 may query a logic volume path of block addresses in a volume database according to said unique ID and write the backup data into the block address in a mode of a virtual file system to recover cache data.

When an unexpected power outage occurs, the system will be able to utilize the residual power to write the cache data stored in the high speed volatile memory into non-volatile flash memory. When the power is restored, the system then write the backup cache data in the flash memory back to block devices, so as to effectively preventing data loss due to sudden interruption of power supply.

In another preferred embodiment, the crash-proof cache data protection system further includes a determination unit 200. The determination unit 200 acquires a backup identification parameter from the backup data in the flash memory when the power is back up, identifies the backup identification parameter, and executes steps to recover cache data only when said the value of the backup identification parameter is 1. When the backup identification parameter is 0, the acquisition unit 310 does not acquire the backup data.

In another preferred embodiment, the cache data recovery module 300 further comprises a configuration unit 340. The configuration unit may set the backup identification parameter to 0 after the backup data has been restored.

In another preferred embodiment, the access and inquiry unit 120 further includes an export sub-unit 121 and comparison sub-unit 122. The export sub-unit 121 exports the doubly linked lists for all block devices. The doubly linked lists include pointers for all said block devices. The comparison sub-unit 122 queries to obtain index nodes of block devices corresponding to logical volume management volumes by comparing the pointers in logical volume management volumes and doubly linked list pointers to locate the matching block devices.

In a preferred embodiment, the page unit further includes a search sub-unit that acquires a page by using a pointer in an index node obtained by searching the labeled index nodes in a radix tree.

Most or part of processes discussed above may easily be applied via certain computer software program controlling certain hardware. The program may be stored in a computer readable storage medium. The storage medium may be a magnetic disk, an optical disk, a Read-Only Memory (ROM), or Random Access Memory (RAM).

While embodiments of the system and method have been particularly shown and described with reference to the preferred embodiment thereof, it will be understood by those skilled in the art that various modifications, additions and substitutions in form and detail may be made therein without departing from the spirit and scope of the invention, as set forth in the following claims.

What is claimed is:

1. A crash-proof cache data protection method comprising:
    backing up cache data;
    recovering cache data;
    wherein said step of backing up cache data further comprising the steps of:
        receiving an interrupt request signal by a preselected central processing unit ("CPU") when a power interruption unexpectedly occurs;
        querying to obtain index nodes of one or more block devices corresponding to logical volume management volumes;
        acquiring a page needing to be stored in a flash memory according to said index nodes;
        acquiring a buffer head in the page and storing information of said buffer head and buffer data corresponding to the buffer head into a flash memory and generating backup data;
    wherein said step of recovering cache data further comprising the steps of:
        acquiring said backup data which includes a unique ID and a logic block ID of a block device;
        calculating block address of said backup data needing to be recovered using said logic block ID;
        querying a logic volume path of block addresses in a volume database according to said unique ID; and
        writing the backup data into the block address in a mode of a virtual file system to recover cache data.

2. The crash-proof cache data protection method of claim 1 further comprising the follow steps that precede said step of recovering cache data:
    acquiring a backup identification parameter from said backup data in the flash memory when power is back up and identifying the value of the backup identification parameter; and
    executing the step of recovering cache data only when said value of said backup identification parameter is 1.

3. The crash-proof cache data protection method of claim 2 further comprising the follow step that succeeds said step of recovering cache data:
    setting said backup identification parameter to 0.

4. The crash-proof cache data protection method of claim 1 wherein said step of querying to obtain index nodes of block devices corresponding to logical volume management volumes further comprising:
    exporting doubly linked lists for all block devices and said doubly linked list includes pointers for all said block devices;
    querying to obtain index nodes of block devices corresponding to logical volume management volumes by comparing said logical volume management volumes and doubly linked list pointers to locate the block devices with doubly linked list pointers that match the pointers in said logical volume management volumes.

5. The crash-proof cache data protection method of claim 1 wherein said step of acquiring a page needing to be stored in a flash memory according to said index nodes further comprising:
    acquiring said page by using a pointer in an index node obtained by searching the labeled index nodes in a radix tree.

6. A crash-proof cache data protection system comprising:
    a cache data backup module;
    a cache data recovery module;

wherein said cache data backup module further comprising:
a receiver unit;
an access and inquiry unit;
a page unit;
an access and generation unit;
wherein said receiver unit is configured to receive an interrupt request signal by a preselected central processing unit ("CPU") when power interruption unexpectedly occurs;
wherein said access and inquiry unit is configured to query and obtain index nodes of one or more block devices corresponding to logical volume management volumes;
wherein said page unit is configured to acquire a page needing to be stored in a flash memory according to said index nodes;
wherein said access and generation unit is configured to acquire a buffer head in the page and store information of said buffer head and buffer data corresponding to the buffer head into a flash memory, and generate backup data;
wherein said cache data recovery module further comprising:
an acquisition unit;
a conversion unit;
a query and recovery unit;
wherein said acquisition unit is configured to acquire said backup data which includes a unique ID and a logic block ID of a block device;
wherein said conversion unit is configured to calculate block address of said backup data needing to be recovered using said logic block ID; and
wherein said query and recovery unit is configured to query a logic volume path of block addresses in a volume database according to said unique ID and write the backup data into the block address in a mode of a virtual file system to recover cache data.

7. The crash-proof cache data protection system of claim 6 further comprising a determination unit wherein said determination unit is configured to acquire a backup identification parameter from the backup data in the flash memory when the power is back up, identify the backup identification parameter, and executing steps to recover cache data only when said the value of said backup identification parameter is 1.

8. The crash-proof cache data protection system of claim 7 wherein the said cache data recovery module further comprising a configuration unit wherein said configuration unit is configured to set said backup identification parameter to 0 after the said cache data has been restored.

9. The crash-proof cache data protection system of claim 6 wherein said access and inquiry unit further comprising:
an export sub-unit;
a comparison sub-unit;
wherein said export sub-unit is configured to exporting doubly linked list for all block devices and said doubly linked list include pointers for all said block devices; and
wherein said comparison sub-unit is configured to query and obtain index nodes of block devices corresponding to logical volume management volumes by comparing said logical volume management volumes and doubly linked list pointers to locate the block devices with doubly linked list pointers that match the pointers in said logical volume management volumes.

10. The crash-proof cache data protection system of claim 7 wherein said page unit further comprising a search sub-unit configured to acquire said page by using a pointer in an index node obtained by searching the labeled index nodes in a radix tree.

* * * * *